United States Patent
Horng et al.

(10) Patent No.: US 11,067,453 B2
(45) Date of Patent: *Jul. 20, 2021

(54) THERMAL DETECTION CIRCUIT

(71) Applicant: TAIWAN SEMICONDUCTOR MANUFACTURING CO., LTD., Hsinchu (TW)

(72) Inventors: Jaw-Juinn Horng, Hsinchu (TW); Szu-Lin Liu, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,180

(22) Filed: Dec. 13, 2019

(65) Prior Publication Data

US 2020/0116573 A1 Apr. 16, 2020

Related U.S. Application Data

(63) Continuation of application No. 15/818,655, filed on Nov. 20, 2017, now Pat. No. 10,508,957, which is a (Continued)

(51) Int. Cl.
    *G01K 7/00* (2006.01)
    *G01K 7/01* (2006.01)

(52) U.S. Cl.
    CPC .................. *G01K 7/00* (2013.01); *G01K 7/01* (2013.01)

(58) Field of Classification Search
    CPC ....................................................... G01K 7/00
    See application file for complete search history.

(56) References Cited

U.S. PATENT DOCUMENTS

| 5,546,041 A | 8/1996 | Szajda |
| 6,037,807 A | 3/2000 | Wu et al. |

(Continued)

FOREIGN PATENT DOCUMENTS

| CN | 101169341 A | 4/2008 |
| CN | 204085732 U | 1/2018 |

(Continued)

OTHER PUBLICATIONS

J. Shor et al. "Miniaturized BJT-Based Thermal Sensor for Microprocessors in 31- and 22-nm Technologies." IEEE J. of Solid-State Circuits, vol. 481 pp. 2860-2867, Nov. 2013.

(Continued)

*Primary Examiner* — Hai L Nguyen
(74) *Attorney, Agent, or Firm* — Maschoff Brennan

(57) ABSTRACT

A circuit is disclosed that includes a capacitive element, a control circuit, and a first switch and a second switch. The capacitive element is configured to generate an output voltage at a terminal thereof. The control circuit is configured to generate a first control signal and a second control signal in response to a first temperature-dependent voltage, a second temperature-dependent voltage, and the output voltage. The first switch and the second switch are coupled to the capacitive element, and configured to be turned on or off in response to the first control signal and the second control signal respectively. The first switch and the second switch have different switching status from each other in a charge mode.

20 Claims, 5 Drawing Sheets

Related U.S. Application Data continuation of application No. 14/946,559, filed on Nov. 19, 2015, now Pat. No. 9,841,326.

(60) Provisional application No. 62/181,102, filed on Jun. 17, 2015.

(56) References Cited

U.S. PATENT DOCUMENTS

| | | | |
|---|---|---|---|
| 6,140,860 A | 10/2000 | Sandhu et al. | |
| 6,914,764 B2 | 7/2005 | Clabes | |
| 6,930,520 B2 * | 8/2005 | Solie | H03K 3/011 |
| | | | 327/131 |
| 7,771,115 B2 | 8/2010 | Pan | |
| 7,863,992 B2 * | 1/2011 | Chung | H03K 4/501 |
| | | | 331/111 |
| 7,915,947 B2 | 3/2011 | Liu et al. | |
| 8,901,992 B1 | 12/2014 | Lim | |
| 8,959,994 B2 | 2/2015 | Tai et al. | |
| 9,004,754 B2 | 4/2015 | Swei | |
| 9,702,763 B2 | 7/2017 | Horng et al. | |
| 9,841,326 B2 | 12/2017 | Horng | |
| 2014/0369381 A1 | 12/2014 | Horng et al. | |

FOREIGN PATENT DOCUMENTS

| | | |
|---|---|---|
| JP | 2011027625 A | 2/2011 |
| TW | 201031901 A | 9/2010 |

OTHER PUBLICATIONS

J. J. Horng et al, :A 0.7V Resistive Sensor with Temperature/Voltage Detection Function in 16nm FinFET Technologies:, IEEE VLSI symp., Jun. 2014.

* cited by examiner

THERMAL DETECTION CIRCUIT

PRIORITY CLAIM AND CROSS-REFERENCE

This application is a continuation of U.S. application Ser. No. 15/818,655, filed Nov. 20, 2017, now U.S. Pat. No. 10,508,957, issued on Dec. 17, 2019, which is a continuation of U.S. application Ser. No. 14/946,559, filed Nov. 19, 2015, now U.S. Pat. No. 9,841,326 B2, issued on Dec. 12, 2017, which claims priority to U.S. Provisional Application Ser. No. 62/181,102, filed Jun. 17, 2015, which is herein incorporated by reference.

BACKGROUND

Thermal performance is becoming an important characteristic of semiconductor devices including, for example, integrated circuits (ICs). Semiconductor devices behave differently at different temperatures. For example, effects of temperature on integrated circuits significantly affect operational characteristics of the integrated circuits. Furthermore, heat dissipated into the integrated circuits may cause reliability issues due to high temperature unless they are monitored.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
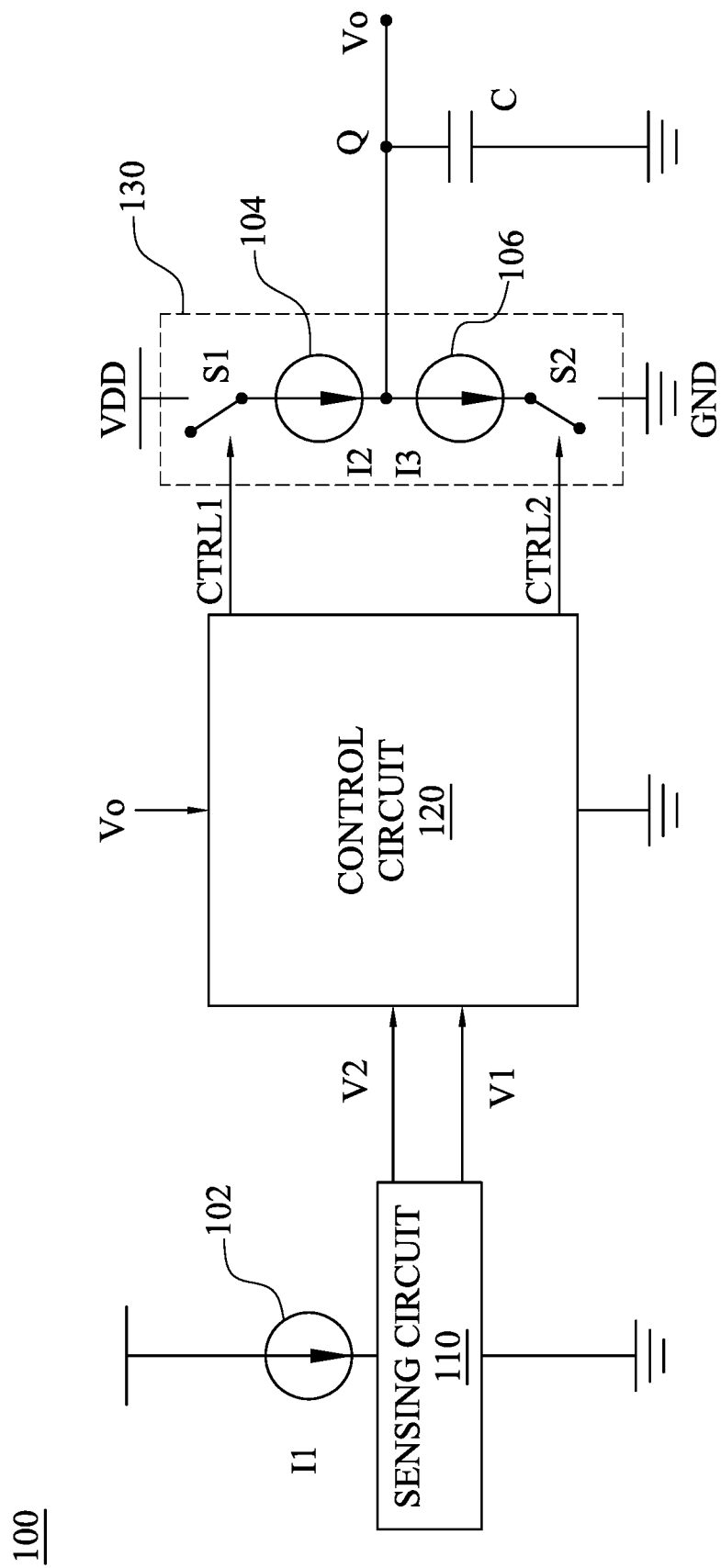
FIG. 1 is a block diagram of a detection circuit in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

FIG. 1 is a block diagram of a detection circuit 100 in accordance with some embodiments of the present disclosure. In some embodiments, the detection circuit 100 is applied in a thermal/temperature sensor or a thermal/temperature detection circuit. As illustratively shown in FIG. 1, the detection circuit 100 includes a sensing circuit 110, a control circuit 120, a switching circuit 130, and a capacitor C.

The sensing circuit 110 is configured to generate temperature-dependent voltages V1 and V2 based on a current source 102 providing a current I1. In some embodiments, the sensing circuit 110 includes sensing elements (not shown) that are coupled in series and operate as a voltage divider. The temperature-dependent voltages V1 and V2 are generated at respective nodes where two sensing elements are coupled.

In some embodiments, the sensing elements in the sensing circuit 110 are implemented by resistors including, for example, titanium nitride (TiN) resistor, poly gate resistor, metal resistor, n-well resistor, implant resistor, etc., or the combination thereof. In some other embodiments, the sensing elements in the sensing circuit 110 are implemented by transistors including, for example, metal oxide semiconductor (MOS) transistor, bipolar junction transistor (BJT), etc., or the combination thereof. The aforementioned devices to implement the sensing elements are given for illustrative purposes. Various types of sensing elements are within the contemplated scope of the present disclosure.

The control circuit 120 is configured to receive the temperature-dependent voltages V1 and V2 and an output voltage Vo to generate control signals CTRL1 and CTRL2. The control signals CTRL1 and CTRL2 are configured to control the switching circuit 130.

The switching circuit 130 is coupled to the capacitor C at a node Q. The switching circuit 130 is configured to couple the capacitor C to a voltage supply VDD in response to the control signal CTRL1, and alternatively couple the capacitor C to a ground GND in response to the control signal CTRL2, to generate the output voltage Vo at the node Q.

In some embodiments, the capacitor C is implemented by, for example, MOS capacitor, metal-oxide-metal (MOM) capacitor, metal-insulator-metal (MIM) capacitor, or the combination thereof. In some other embodiments, the capacitor C is implemented by hybrid capacitor including, for example, electrolytic capacitor, ceramic capacitor, tantalum capacitor, or the combination thereof. The aforementioned devices to implement the capacitor C are given for illustrative purposes. Various types of capacitive elements are within the contemplated scope of the present disclosure.

As illustratively shown in FIG. 1, in some embodiments, the switching circuit 130 includes switches S1 and S2. The switches S1 and S2 are controlled by the control signals CTRL1 and CTRL2, respectively, to be turned on alternately for charging and discharging the capacitor C. Effectively, the output voltage Vo varies in response to the charging and discharging of the capacitor C.

In some embodiments, the switch S1 is coupled between the voltage supply VDD and a current source 104 providing a current I2, as illustrated in FIG. 1. In various embodiments, the switch S1 is coupled between the current source 104 and the node Q. Moreover, in some embodiments, the switch S2 is coupled between the ground GND and a current source 106 providing a current I3, as illustrated in FIG. 1. In various embodiments, the switch S2 is coupled between the current source 106 and the node Q. Therefore, configuration of the switching circuit 130 in FIG. 1 is given for illustrative purposes. Various configurations of the switching circuit 130 are within the contemplated scope of the present disclosure.

Figure 2:
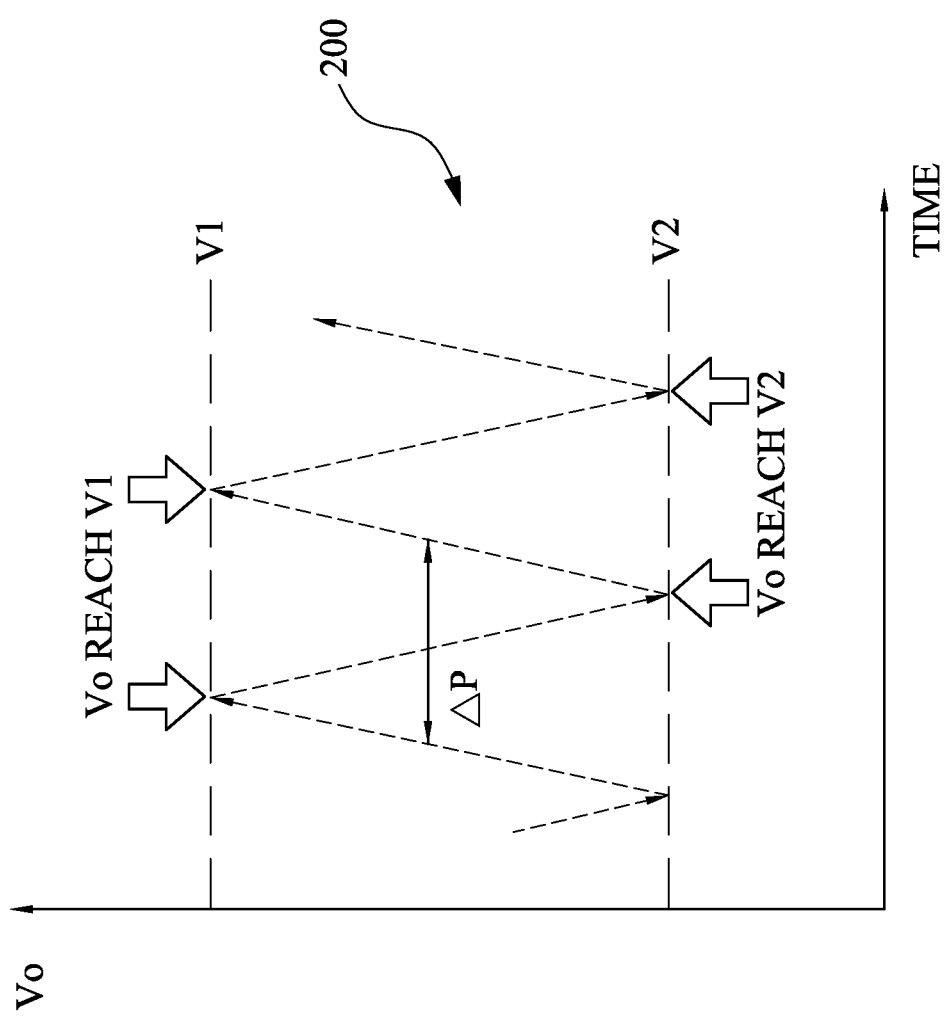
FIG. 2 is a graph of a waveform illustrating behavior of the output voltage Vo illustrated in FIG. 1, in accordance with some embodiments of the present disclosure.

FIG. 2 is a graph of a waveform 200 illustrating behavior of the output voltage Vo illustrated in FIG. 1, in accordance with some embodiments of the present disclosure. As illustratively shown in FIG. 2, the waveform 200 represents variation of the output voltage Vo in FIG. 1 with reference to the temperature-dependent voltages V1 and V2 over time.

For illustration in FIG. 1 and FIG. 2, in a charging mode, the control circuit 120 generates the control signal CTRL1 for turning on the switch S1, while the switch S2 is turned off. Accordingly, the capacitor C is coupled through the switch S1 to the voltage supply VDD, and charged by the current source 104 providing the current I2. As a result, the output voltage Vo increases.

When the output voltage Vo increases to reach the temperature-dependent voltage V1, the control circuit 120 turns into a discharging mode, and generates the control signal CTRL2 for turning on the switch S2, while the switch S1 is turned off. Accordingly, the capacitor C is coupled through the switch S2 to the ground GND, and discharged by the current source 106 providing a current I3. As a result, the output voltage Vo decreases. When the output voltage Vo decreases to reach the temperature-dependent voltage V2, the control circuit 120 turns into the charging mode again.

Over time, the switches S1 and S2 are turned on alternately in response to the control signals CTRL1 and CTRL2, for charging and discharging the capacitor C alternately. The output voltage Vo therefore increases in the charging mode and decreases in the discharging mode, as illustrated by the waveform 200.

For illustration in FIG. 2, ΔP represents a time period of the output voltage Vo. In some embodiments, at a particular temperature T, the time period ΔP has a particular value. When the temperature T changes, the time period ΔP changes to a corresponding value. Accordingly, when a time period is achieved based on the waveform 200, a corresponding temperature is determined. As a result, the corresponding temperature is able to be sensed or measured. Alternatively stated, a variation of one temperature to another temperature is monitored and/or measured.

Figure 3:
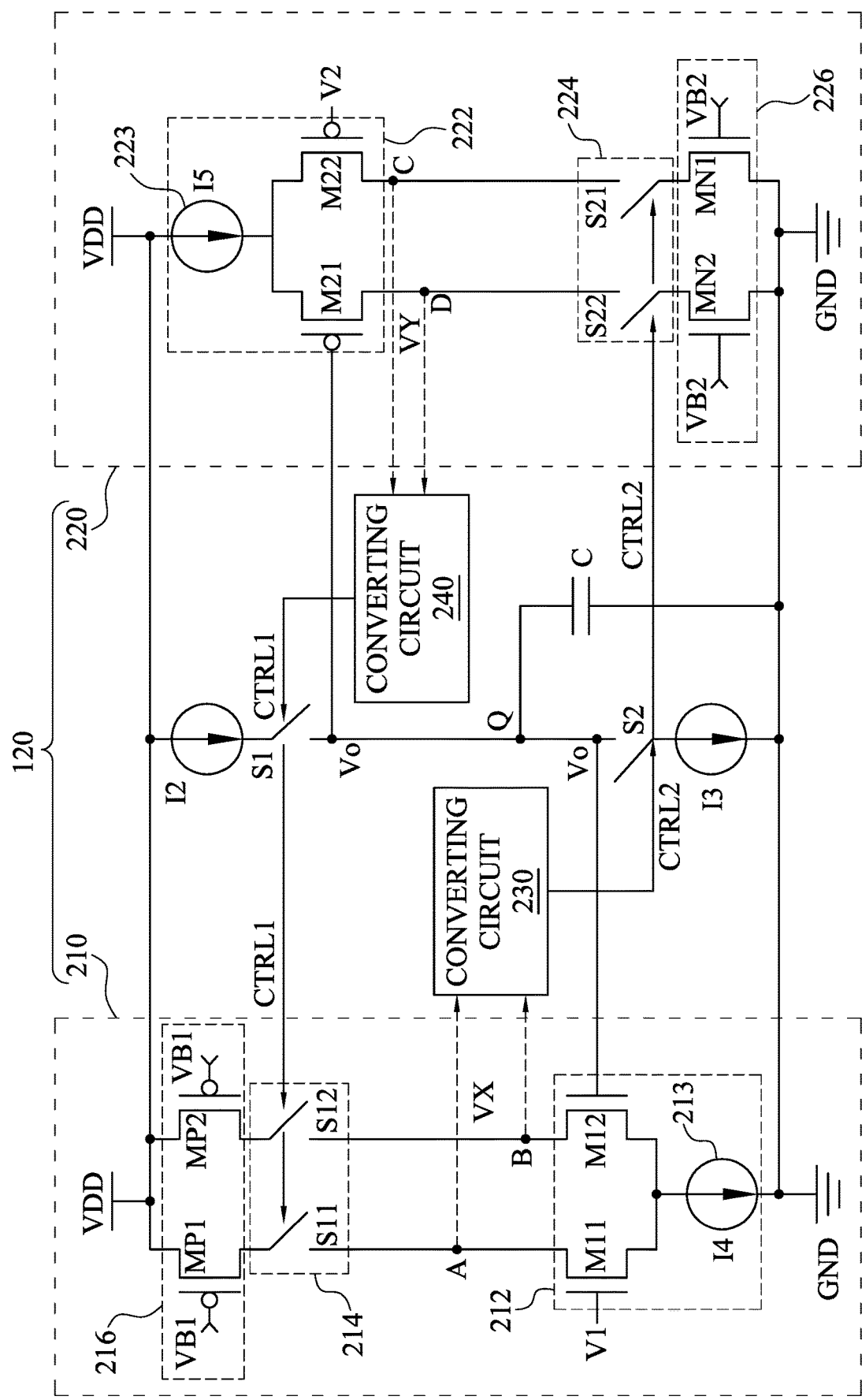
FIG. 3 is a circuit diagram of the control circuit in FIG. 1 in accordance with some embodiments of the present disclosure.

FIG. 3 mainly illustrates a circuit diagram of the control circuit 120 in FIG. 1 in accordance with some embodiments of the present disclosure. For convenience of illustration and complete understanding, the switching circuit 130 and the capacitor C in FIG. 1 are also illustrated together with the control circuit 120 in FIG. 3. As illustratively shown in FIG. 3, the control circuit 120 includes comparing circuits 210 and 220. The comparing circuit 210 is configured to be activated in response to the control signal CTRL1, and configured to compare the temperature-dependent voltage V1 with the output voltage Vo. The comparing circuit 220 is configured to be activated in response to the control signal CTRL2, and configured to compare the temperature-dependent voltage V2 with the output voltage Vo. The switch S1 is turned on alternately in response to the control signal CTRL1, and the switch S2 is turned on alternately in response to the control signal CTRL2, as described above. In some embodiments, the comparing circuits 210 and 220 are implemented by operational amplifiers. Various devices to implement the comparing circuits 210 and 220 are within the contemplated scope of the present disclosure.

For illustration in FIG. 3, in some embodiments, the comparing circuit 210 includes a differential input pair 212, and the comparing circuit 220 includes a differential input pair 222. The differential input pair 212 is coupled to the capacitor C at the node Q, and the sensing circuit 110 in FIG. 1. The differential input pair 212 receives the temperature-dependent voltage V1 and the output voltage Vo. The differential input pair 212 generates an intermediate signal VX in response to the temperature-dependent voltage V1 and the output voltage Vo. For illustration, the intermediate signal VX indicates an output voltage of the differential input pair 212, and/or indicates a voltage difference between output terminals A and B of the differential input pair 212.

The differential input pair 222 is coupled to the capacitor C at the node Q, and the sensing circuit 110 in FIG. 1. The differential input pair 222 receives and compares the temperature-dependent voltage V2 and the output voltage Vo. The differential input pair 222 generates an intermediate signal VY in response to the temperature-dependent voltage V2 and the output voltage Vo. For illustration, the intermediate signal VY indicates an output voltage of the differential input pair 222, and/or indicates a voltage difference between output terminals C and D of the differential input pair 222.

For illustration, in some embodiments, the differential input pair 212 includes two NMOS transistors M11 and M12 and a current source 213 providing a current I4. Gates of the NMOS transistors M11 and M12 are configured to receive the temperature-dependent voltage V1 and the output voltage Vo, respectively. Drains of the NMOS transistors M11 and M12 are configured as the output terminals A and B, respectively. Sources of the NMOS transistors M11 and M12 are coupled to the current source 213. With the temperature-dependent voltage V1 and the output voltage Vo, the NMOS transistors M11 and M12 are turned on, respectively, and voltages at the output terminals A and B are generated accordingly. With the voltages at the output terminals A and B, the intermediate signal VX indicating the voltage difference between the output terminals A and B is generated.

Correspondingly, in some embodiments, the differential input pair 222 includes two PMOS transistors M21 and M22 and a current source 223 providing a current I5. Gates of the PMOS transistors M21 and M22 are configured to receive the output voltage Vo and the temperature-dependent voltage V2, respectively. Drains of the PMOS transistors M21 and M22 are configured as the output terminals D and C, respectively. Sources of the PMOS transistors M21 and M22 are coupled to the current source 223. With the output voltage Vo and the temperature-dependent voltage V2, the PMOS transistors M21 and M22 are turned on, respectively, and voltages at the output terminals D and C are generated accordingly. With the voltages at the output terminals D and C, the intermediate signal VY indicating the voltage difference between the output terminals D and C is generated.

The configurations of the differential input pairs 212 and 222 shown in FIG. 3 are given for illustrative purposes. Various configurations of the differential input pairs 212 and 222 are within the contemplated scope of the present disclosure. For example, in various embodiments, each one of the differential input pairs 212 and 222 is a full swing differential input pair which is configured to receive full swing differential inputs.

In some embodiments, the control circuit 120 further includes converting circuits 230 and 240, as illustrated in FIG. 3. The converting circuit 230 is configured to generate the control signal CTRL2 in response to the intermediate signal VX from the differential input pair 212. The converting circuit 240 is configured to generate the control signal CTRL1 in response to the intermediate signal VY from the differential input pair 222. In further embodiments, the converting circuit 230 converts the intermediate signal VX to the control signal CTRL2, and/or the converting circuit 240 converts the intermediate signal VY to the control signal CTRL1.

In some embodiments, the converting circuit 230 is a phase adjust circuit, and converts the intermediate signal VX to the control signal CTRL2 by adjusting a phase of the intermediate signal VX. For illustration, a phase of the intermediate signal VX is inverted by the converting circuit 230, and the inverted intermediate signal VX is outputted as the control signal CTRL2. In some embodiments, the converting circuit 240 is a phase adjust circuit, and converts the intermediate signal VY to the control signal CTRL1 by adjusting a phase of the intermediate signal VY. For illustration, a phase of the intermediate signal VY is inverted by the converting circuit 240, and the inverted intermediate signal VY is outputted as the control signal CTRL1.

Figure 5B:
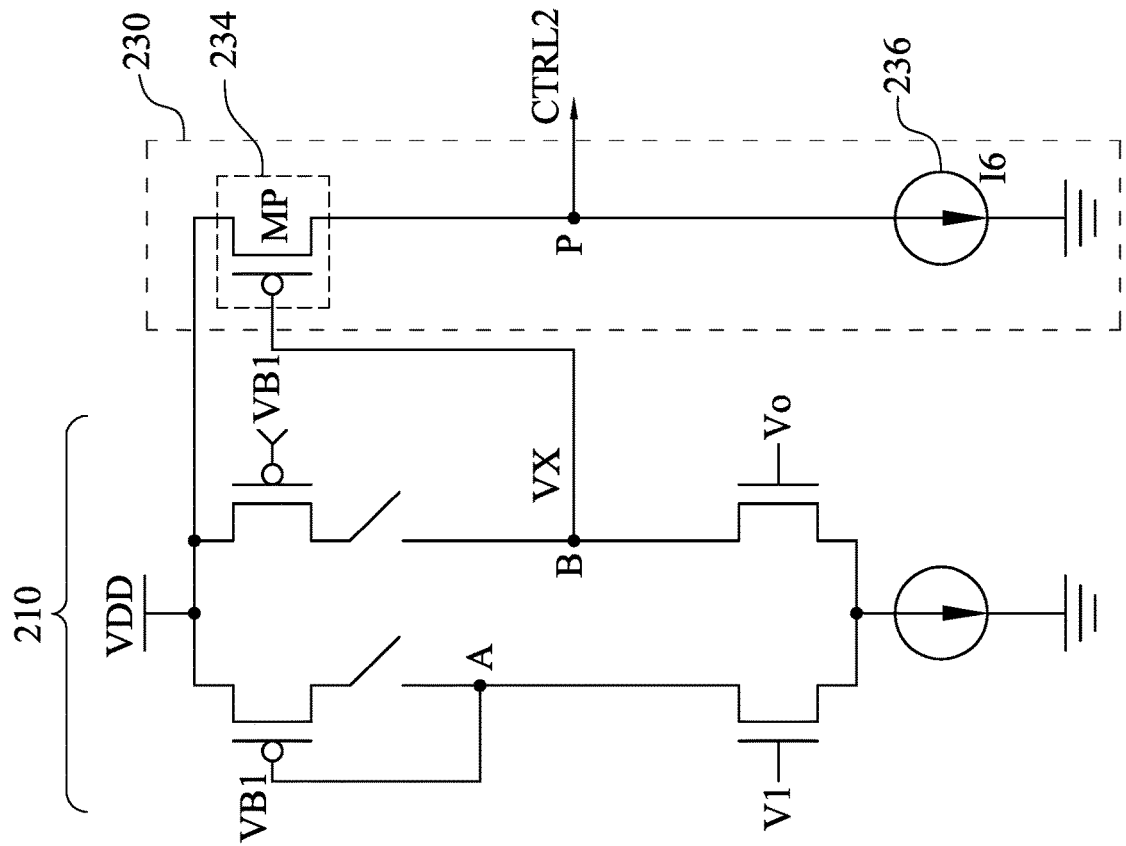
FIG. 5A and FIG. 5B are each a circuit diagram of the converting circuit associated with the comparing circuit in FIG. 3, in accordance with various embodiments of the present disclosure.
Figure 5A:
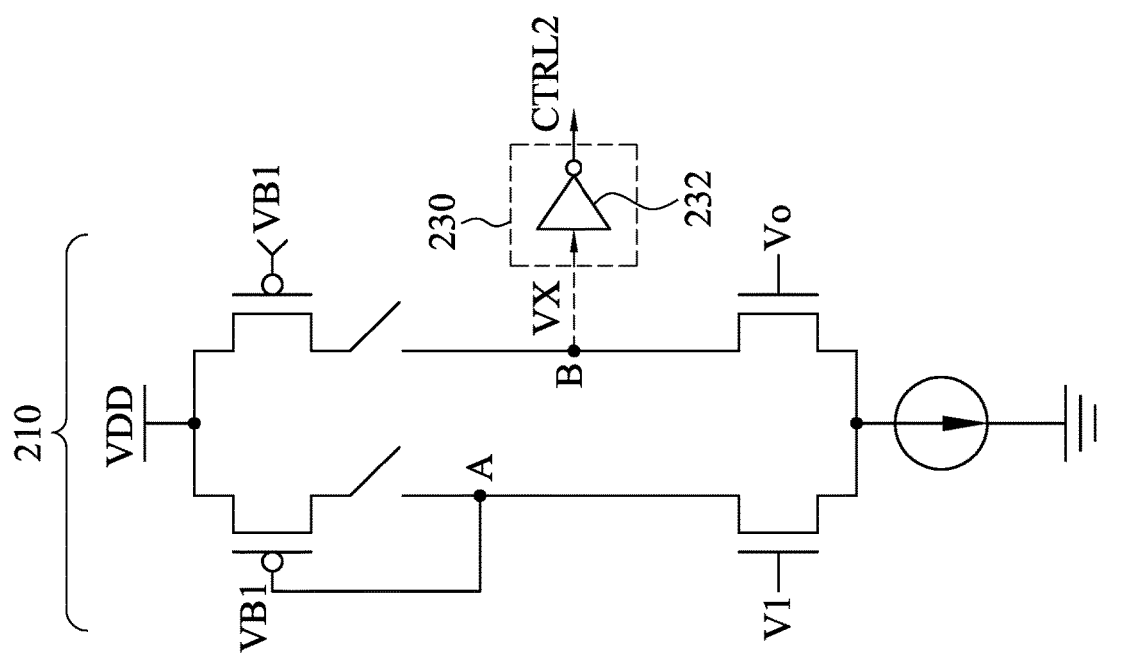

Number of the converting circuits in FIG. 3 is given for illustrative purposes. Various numbers of the converting circuits in FIG. 3 are within the contemplated scope of the present disclosure. For example, in various embodiments, a single converting circuit is required in the control circuit 120. In such embodiments, the single converting circuit generates the control signal CTRL2 in response to the intermediate signal VX, and also generates the control signal CTRL1 in response to the intermediate signal VY. In alternative embodiments, the converting circuits 230 and 240 in FIG. 3 are omitted, and accordingly, the intermediate signals VX and VY are configured as the control signals CTRL2 and CTRL1, respectively, as shown in FIGS. 5A and 5B for examples.

Moreover, configurations of the converting circuits in FIG. 3 are also given for illustrative purposes. Various configurations of the converting circuits in FIG. 3 are within the contemplated scope of the present disclosure. For example, in various embodiments, the converting circuit 230 is configured in the comparing circuit 210, and/or the converting circuit 240 is configured in the comparing circuit 220.

As illustratively shown in FIG. 3, in some embodiments, the comparing circuit 210 further includes a switching unit 214, and/or the comparing circuit 220 further includes a switching unit 224. The switching unit 214 is configured to be turned on by the control signal CTRL1, to couple the differential input pair 212 to an active load 216 providing operation voltage. The switching unit 224 is configured to be turned on by the control signal CTRL2, to couple the differential input pair 222 to an active load 226 providing operation voltage.

For illustration in FIG. 3, in some embodiments, the switching unit 214 includes switches S11 and S12, and the switching unit 224 includes switches S21 and S22. The switch S11 is coupled between the output terminal A and the active load 216. The switch S12 is coupled between the output terminal B and the active load 216. The switches S11 and S12 are controlled by the control signal CTRL1 to turn on or off. The switch S21 is coupled between the output terminal C and the active load 226. The switch S22 is coupled between the output terminal D and the active load 226. The switches S21 and S22 are controlled by the control signal CTRL2 to turn on or off.

The configurations of the switching unit 214 and/or the switching unit 224 are given for illustrative purposes. Various configurations of the switching unit 214 and/or the switching unit 224 are within the contemplated scope of the present disclosure. For example, in various embodiments, the switching unit 214 is coupled between the active load 216 and the voltage supply VDD. For another example, in various embodiments, the switching unit 224 is coupled between the active load 226 and the ground GND.

For illustration in FIG. 3, in some embodiments, the active load 216 includes two PMOS transistors MP1 and MP2. The PMOS transistors MP1 and MP2 are biased with a voltage VB1, and coupled to the switches S11 and S12, respectively. In some embodiments, the active load 226 includes two NMOS transistors MN1 and MN2. The NMOS transistors MN1 and MN2 are biased with a voltage VB2, and coupled to the switches S21 and S22, respectively.

The configurations of the active load 216 and/or the active load 226 are given for illustrative purposes. Various configurations of the active load 216 and/or the active load 226 are within the contemplated scope of the present disclosure. For example, in various embodiments, the active load 216 includes two PMOS transistors that are cross coupled. For illustration of the cross-coupled two PMOS transistors, a gate of a first PMOS transistor is coupled to a drain of a second PMOS transistor, a drain of the first PMOS transistor is coupled to a gate of the second PMOS transistor, and sources of the first and second PMOS transistors are configured to receive a supply voltage. For another example, in various embodiments, the active load 226 includes two NMOS transistors that are cross coupled.

The configuration of the control circuit 120 in FIG. 3 is given for illustrative purposes. Various configurations of the control circuit 120 are within the contemplated scope of the present disclosure. For example, in various embodiments, the active load 216 and the switching unit 214 are configured outside the comparing circuit 210, and/or the active load 226 and the switching unit 224 are configured outside the comparing circuit 220. In alternative embodiments, the active load 216 and the switching unit 214 are integrated with the converting circuit 230, and/or the active load 226 and the switching unit 224 are integrated with the converting circuit 240.

Figure 4:
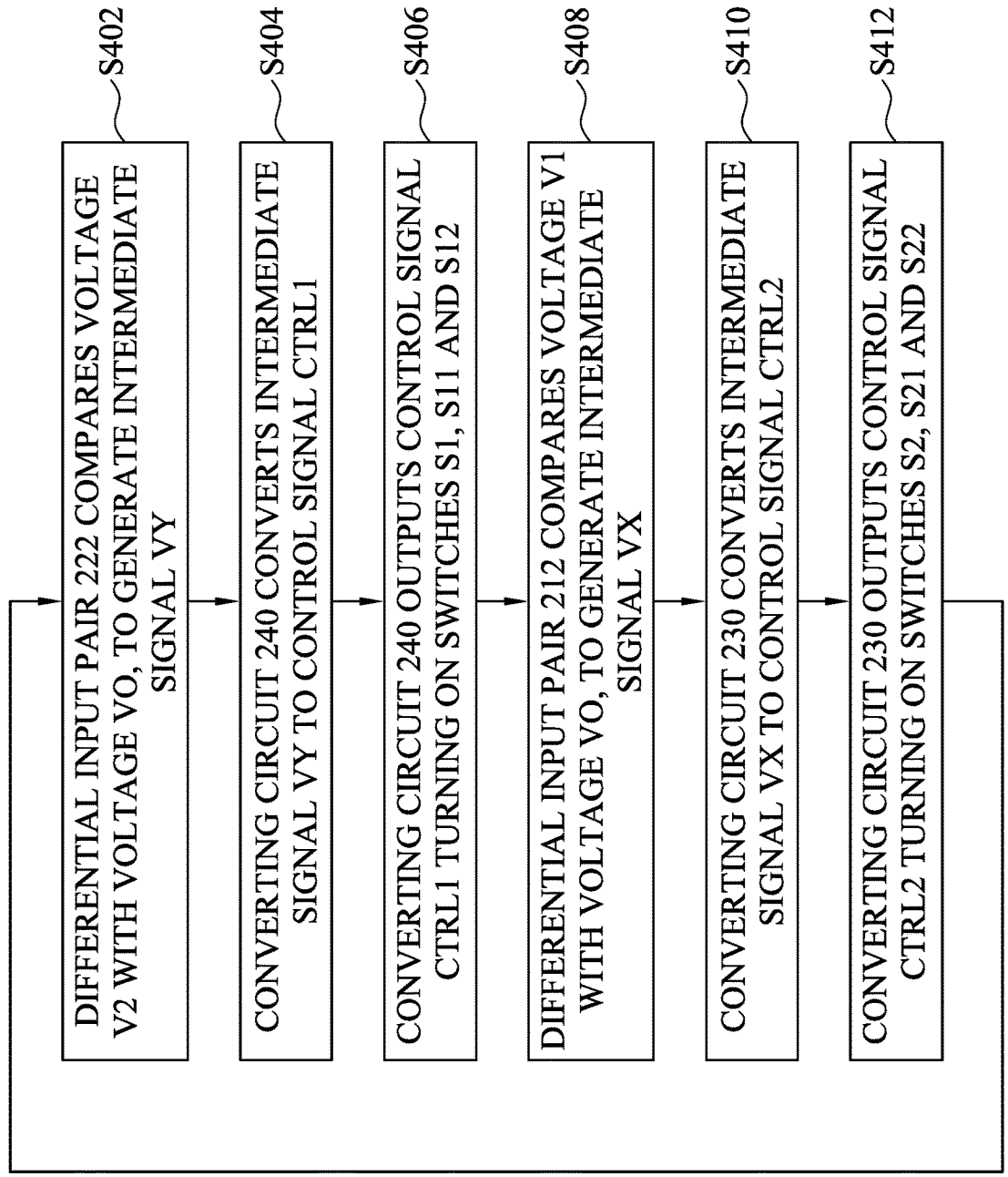
FIG. 4 is a flow chart of a method illustrating operations of the control circuit in FIG. 3, in accordance with some embodiments of the present disclosure.

FIG. 4 is a flow chart of a method 400 illustrating operations of the control circuit 120 in FIG. 3, in accordance with some embodiments of the present disclosure. The method 400 includes operations S402-S412 that are described below with reference to FIG. 2 and FIG. 3.

In operation S402, the differential input pair 222 compares the temperature-dependent voltage V2 with the output voltage Vo, to generate the intermediate signal VY.

In operation S404, the converting circuit 240 converts the intermediate signal VY to the control signal CTRL1 turning off the switch S1 and the switches S11 and S12. With the turn-off of the switches S11 and S12, the differential input pair 212 is deactivated.

In some embodiments, the intermediate signal VY is converted by adjusting a phase of the intermediate signal VY, to generate the control signal CTRL1. In some other embodiments, the intermediate signal VY is converted by amplifying the intermediate signal VY, to generate the control signal CTRL1. The aforementioned ways to convert the intermediate signal VY are given for illustrative purposes. Various ways to convert the intermediate signal VY are within the contemplated scope of the present disclosure.

In operation S406, when the output voltage Vo is smaller than or reaches the temperature-dependent voltage V2, the converting circuit 240 outputs the control signal CTRL1, converted from the intermediate signal VY, turning on the switch S1 and the switches S11 and S12. With the turn-on of the switches S11 and S12, the differential input pair 212 is activated accordingly.

In operation S408, the differential input pair 212 compares the temperature-dependent voltage V1 with the output voltage Vo, to generate the intermediate signal VX.

In operation S410, the converting circuit 230 converts the intermediate signal VX to the control signal CTRL2 turning off the switch S2 and the switches S21 and S22. With the turn-off of the switches S21 and S22, the differential input pair 222 is deactivated.

Moreover, with the turn-off of the switch S2 and the turn-on of the switch S1, as discussed above, the detection circuit 100 is turned into the charging mode. Accordingly, the capacitor C is coupled through the turn-on switch S1 to the voltage supply VDD, to be charged. As a result, the output voltage Vo increases according to the charged capacitor C.

In some embodiments, the intermediate signal VX is converted by adjusting a phase of the intermediate signal VX, to generate the control signal CTRL2. In some other embodiments, the intermediate signal VX is converted by amplifying the intermediate signal VX, to generate the control signal CTRL2. The aforementioned ways to convert the intermediate signal VX are given for illustrative purposes. Various ways to convert the intermediate signal VX are within the contemplated scope of the present disclosure.

In operation S412, when the output voltage Vo increases to be greater than or reach the temperature-dependent voltage V1, the converting circuit 230 outputs the control signal CTRL2, converted from the intermediate signal VX, turning on the switch S2 and the switches S21 and S22. With the turn-on of the switches S21 and S22, the differential input pair 222 is activated accordingly. Operations S402 and S404 are then performed again, to turn off the switch S1 and the switches S11 and S12.

With the turn-off of the switch S1 and the turn-on of the switch S2, as discussed above, the detection circuit 100 is turned into the discharging mode. Accordingly, the capacitor C is coupled through the turn-on switch S2 to the ground GND, to be discharged. As a result, the output voltage Vo decreases according to the discharged capacitor C.

When the output voltage Vo decreases to be smaller than or reach the temperature-dependent voltage V2, operation S406 is performed again.

In some approaches, for a detection circuit, there are various signal processing circuits (e.g., digital RS latch circuit) between a comparing circuit and a switching circuit. The various signal processing circuits process the output of the comparing circuit, and generates a control signal for controlling the switching circuit, in order to charge or discharge a capacitive element to generate an output signal. However, the various signal processing circuits cause delays for generating the output signal.

Compared with the detection circuit in other approaches, the detection circuit 100 of the present disclosure is able to generate the output signal without the digital RS latch circuit between the comparing circuit and the switching circuit. Accordingly, the delays between the comparing circuit and the switching circuit are decreased. As a result, the speed of generating the output signal in the detection circuit 100 of the present disclosure is relatively faster than the speed of the detection circuit in other approaches.

Furthermore, without the digital RS latch circuit as described above, the output of the comparing circuit of the present disclosure is still able to be used to control the switching circuit. Accordingly, the control signal, that is derived from the output of the differential input pair to control the switching circuit, does not need full digital swing required for triggering the digital RS latch circuit. As a result, the comparing circuit of the present disclosure is able to operate with the power lower than the power for the comparing circuit in other approaches.

The method 400 in FIG. 4 is given for illustrative purposes. Various operations of the control circuit 120 in FIG. 3 are within the contemplated scope of the present disclosure. For example, in various embodiments, the method 400 in FIG. 4 further includes operations of initiating or starting the control circuit 120 before the operations illustrated in FIG. 4. In addition, various operations of the control circuit 120 associated with the switching circuit 130 and/or the sensing circuit 110 are also within the contemplated scope of the present disclosure.

The above illustrations include exemplary operations, but the operations are not necessarily performed in the order shown. Operations may be added, replaced, changed order, and/or eliminated as appropriate, in accordance with the spirit and scope of various embodiments of the present disclosure.

As illustratively shown in FIG. 3, in some embodiments, the output of the differential input pair 212 and the output of the differential input pair 222 are cross latched. For illustration, the output terminal A of the differential input pair 212 is connected to the output terminal D of the differential input pair 222, and the output terminal B of the differential input pair 212 is connected to the output terminal C of the differential input pair 222. In operations of such embodiments, when the intermediate signal VX is generated, the output terminals C and D have corresponding voltages according to the intermediate signal VX. Effectively, this speeds up the operation of the differential input pair 222 generating the intermediate signal VY. When the intermediate signal VY is generated, the output terminals A and B have corresponding voltages according to the intermediate signal VY. Effectively, this speeds up the operation of the differential input pair 212 generating the intermediate signal VX.

In various embodiments, one output terminal of the differential input pair 212 and one output terminal the differential input pair 222 are latched. For illustration, the output terminal B of the differential input pair 212 is connected to the output terminal D of the differential input pair 222. Effectively, this also speeds up the operation of the differential input pair 212 generating the intermediate signal VX, and the operation of the differential input pair 222 generating the intermediate signal VY.

FIG. 5A and FIG. 5B are each a circuit diagram of the converting circuit 230 associated with the comparing circuit 210 in FIG. 3, in accordance with various embodiments of the present disclosure.

As illustratively shown in FIG. 5A, in some embodiments, the converting circuit 230 includes an inverter 232. For illustration, the output terminal B is coupled to an input of the inverter 232, and the output terminal A is biased with the voltage VB1. The intermediate signal VX is generated at the output terminal B. The inverter 232 is configured to invert the intermediate signal VX, and output the inverted intermediate signal VX as the control signal CTRL2.

Compared to the embodiments in FIG. 5A, in various embodiments illustrated in FIG. 5B, the converting circuit 230 includes a switch 234 and a current source 236 providing a current I6. The switch 234 is coupled to the current source 236 at a node P. The switch 234 is configured to be turned on by the intermediate signal VX, and couple the node P to the voltage supply VDD, to generate the control signal CTRL2. Effectively, the switch 234 operates as an amplifier to amplify the intermediate signal VX.

In further embodiments, the switch 234 is implemented by a PMOS transistor MP. For illustration, the source of the PMOS transistor MP is coupled to the voltage supply VDD. The gate of the PMOS transistor MP is coupled to the output terminal B to receive the intermediate signal VX. The drain of the PMOS transistor MP is coupled to the current source 234 at the node P.

Configurations of the converting circuit 230 associated with the comparing circuit 210 in FIG. 5A and FIG. 5B are given for illustrative purposes. Various configurations of the converting circuit 230 associated with the comparing circuit 210 are within the contemplated scope of the present disclosure.

Furthermore, in some embodiments, the converting circuit 240 associated with the comparing circuit 220 in FIG. 3 includes configurations corresponding to the configurations illustrated in FIG. 5A and FIG. 5B. For example, in various embodiments, the converting circuit 240 in FIG. 3 also includes an inverter (not shown) corresponding to the inverter 232 in FIG. 5A, or includes a switch (not shown) corresponding to the switch 234 in FIG. 5B. Alternatively stated, configurations of the converting circuit 240 associated with the comparing circuit 220 are also within the contemplated scope of the present disclosure.

In some embodiments of this document, at least one of the switches is implemented with at least one MOS transistor. In further embodiments, each one of the at least one MOS transistor is implemented with stacked MOS transistors or cascaded MOS transistors. In various embodiments, each one of the at least one MOS transistor is controlled with one or more control signals.

In this document, the term "coupled" may also be termed as "electrically coupled", and the term "connected" may be termed as "electrically connected". "Coupled" and "connected" may also be used to indicate that two or more elements cooperate or interact with each other.

In some embodiments, a circuit is disclosed that includes a capacitive element, a control circuit, and a first switch and a second switch. The capacitive element is configured to generate an output voltage at a terminal thereof. The control circuit is configured to generate a first control signal and a second control signal in response to a first temperature-dependent voltage, a second temperature-dependent voltage, and the output voltage. The first switch and the second switch are coupled to the capacitive element, and configured to be turned on or off in response to the first control signal and the second control signal respectively. The first switch and the second switch have different switching status from each other in a charge mode.

Also disclosed is a circuit that includes a first transistor, a second transistor, a first switch, a third transistor, a fourth transistor, and a second switch. The first transistor is configured to receive a first voltage. A first terminal of the second transistor is coupled to a first terminal of the first transistor, and a second terminal of the second transistor is coupled to a node. The first switch is configured to be turned on or off, in response to outputs of the first transistor and the second transistor, to be electrically coupled to the node. The third transistor is configured to receive a second voltage. A first terminal of the fourth transistor is coupled to a first terminal of the third transistor, and a second terminal of the fourth transistor is coupled to the node. The second switch is configured to be turned on or off, in response to output of the third transistor and the fourth transistor, to be electrically coupled to the second terminal of the fourth transistor.

Also disclosed is a method that includes operations outlined below: generating an output voltage at an node of a capacitive element, wherein the output voltage has a voltage level between a first temperature-dependent voltage and a second temperature-dependent voltage; when the output voltage increases to be greater than or reach the first temperature-dependent voltage, pulling down the output voltage through coupling a first voltage to the node of the capacitive element; and when the output voltage decreases to be smaller than or reach the second temperature-dependent voltage, pulling up the output voltage through coupling a second voltage to the node of the capacitive element.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A circuit comprising:
   a capacitive element configured to generate an output voltage at a terminal thereof;
   a control circuit configured to compare a first temperature-dependent voltage with the output voltage to generate a first control signal, and configured to compare a second temperature-dependent voltage with the output voltage to generate a second control signal; and
   a first switch and a second switch that are coupled to the capacitive element, wherein the first switch and the second switch are configured to be controlled by, respectively, the first control signal and the second control signal,
   wherein the first switch and the second switch have different switching status from each other in a charge mode.

2. The circuit of claim 1, wherein the control circuit comprises:
   a first comparing circuit configured to compare the first temperature-dependent voltage with the output voltage in response to the second control signal to generate the first control signal; and a second comparing circuit configured to compare the second temperature-dependent voltage with the output voltage in response to the first control signal to generate the second control signal.

3. The circuit of claim 2, wherein
the first comparing circuit comprises a first differential input pair and the second comparing circuit comprises a second differential input pair;
wherein outputs of the first differential input pair and outputs of the second differential input pair are cross latched.

4. The circuit of claim 3, further comprising:
at least one converting circuit configured to generate, in response to the outputs of the first differential input pair or the outputs of the second differential input pair, at least one control signal for controlling the first switch and the second switch to couple the capacitive element to be charged and discharged alternately.

5. The circuit of claim 2, wherein
the first comparing circuit comprises a first differential input pair and the second comparing circuit comprises a second differential input pair;
wherein the first differential input pair is configured to be activated according to outputs of the second differential input pair, and the second differential input pair is configured to be activated according to outputs of the first differential input pair.

6. The circuit of claim 1, wherein the control circuit comprises:
a first transistor comprising a first terminal configured to receive the first temperature-dependent voltage and a second terminal configured to be coupled to, in response to the first control signal, a first active load;
a second transistor comprising a first terminal coupled to the capacitive element, a second terminal configured to be coupled to the first active load in response to the first control signal, and a third terminal coupled to a third terminal of the first transistor;
a third transistor comprising a first terminal configured to receive the second temperature-dependent voltage and a second terminal configured to be coupled to, in response to the second control signal, a second active load; and
a fourth transistor comprising a first terminal coupled to the capacitive element, a second terminal configured to be coupled to the second active load in response to the second control signal, and a third terminal coupled to a third terminal of the third transistor.

7. The circuit of claim 1, wherein the first switch and the second switch have different switching status from each other in a discharge mode.

8. The circuit of claim 1, wherein the control circuit further comprises:
a comparing circuit comprising a differential input pair; and
a converting circuit configured to generate, in response to outputs of the differential input pair, the first control signal.

9. The circuit of claim 1, wherein the control circuit is further configured to output, in response to comparison, the first control signal to turn on the first switch.

10. A circuit comprising:
a first transistor configured to receive a first voltage;
a second transistor, wherein a first terminal of the second transistor is coupled to a first terminal of the first transistor, and a second terminal of the second transistor is coupled to a node;
a first switch configured to be turned on or off, in response to a first control signal associated with outputs of the first transistor and the second transistor, to be electrically coupled to the node;
a third transistor configured to receive a second voltage;
a fourth transistor, wherein a first terminal of the fourth transistor is coupled to a first terminal of the third transistor, and a second terminal of the fourth transistor is coupled to the node; and
a second switch configured to be turned on or off, in response to a second control signal associated with outputs of the third transistor and the fourth transistor, to be electrically coupled to the second terminal of the fourth transistor.

11. The circuit of claim 10, wherein the first transistor and the second transistor are configured to be turned on, in response to the first voltage and a voltage level of the node respectively, in order to generate a voltage difference at the outputs of the first transistor and the second transistor.

12. The circuit of claim 11, further comprising:
a converting circuit configured to convert the voltage difference at the outputs of the first transistor and the second transistor to the first control signal;
wherein the first switch is further configured to be turned on in response to the first control signal to discharge a capacitive element coupled thereto at the node.

13. The circuit of claim 10, wherein
the third transistor and the fourth transistor are configured to be turned on, in response to the second voltage and a voltage level of the node respectively, in order to generate an intermediate signal between the outputs of the third transistor and the fourth transistor;
wherein the circuit further comprises:
an inverter configured to invert the intermediate signal, and to output the second control signal;
wherein the second switch is further configured to be turned on in response to the second control signal to charge a capacitive element coupled thereto at the node.

14. The circuit of claim 13, further comprising:
a switching unit configured to be turned on by the second control signal, in order for the first transistor and the second transistor to be coupled to an operational voltage.

15. The circuit of claim 13, further comprising:
an active load configured to provide, in response to the second control signal, an operational voltage to the first transistor and the second transistor.

16. The circuit of claim 10, further comprising:
a converting circuit configured to generate, in response to the outputs of the third transistor and the fourth transistor, the second control signal for controlling a switching circuit to activate alternatively the first transistor and the second transistor.

17. A method, comprising:
generating an output voltage at a node of a capacitive element, wherein the output voltage has a voltage level between a first temperature-dependent voltage and a second temperature-dependent voltage;
when the output voltage increases to be greater than or reach the first temperature-dependent voltage, pulling down the output voltage through coupling a first voltage to the node of the capacitive element in response to a first control signal generated according to outputs of a first differential input pair which receives the output voltage and the first temperature-dependent voltage; and when the output voltage decreases to be smaller than or reach the second temperature-dependent voltage, pulling up the output voltage through coupling a second voltage to the node of the capacitive element in response to a second control signal generated according to outputs of a second differential input pair which receives the output voltage and the second temperature-dependent voltage.

18. The method of claim 17, wherein pulling down the output voltage comprises:
controlling a switching circuit by the first control signal to couple the capacitive element to the first voltage to be discharged;
wherein pulling up the output voltage comprises:
controlling the switching circuit by the second control signal different from the first control signal to couple the capacitive element to the second voltage to be charged.

19. The method of claim 17, further comprising:
sensing a temperature of a circuit by determining a time period of the output voltage.

20. The method of claim 17, further comprising:
activating the first differential input pair by the second control signal.

* * * * *